(12) United States Patent
Al Azemi

(10) Patent No.: US 8,614,745 B1
(45) Date of Patent: Dec. 24, 2013

(54) FIRE HYDRANT MONITORING SYSTEM

(71) Applicant: Wasmeyyah M. A. S. Al Azemi, Sabah Al Salem Area (KW)

(72) Inventor: Wasmeyyah M. A. S. Al Azemi, Sabah Al Salem Area (KW)

( * ) Notice: Subject to any disclaimer, the term of this patent is extended or adjusted under 35 U.S.C. 154(b) by 0 days.

(21) Appl. No.: 13/758,903

(22) Filed: Feb. 4, 2013

(51) Int. Cl.
*H04N 7/18* (2006.01)

(52) U.S. Cl.
USPC .......................................................... 348/159

(58) Field of Classification Search
USPC .......................................................... 348/159
See application file for complete search history.

(56) References Cited

U.S. PATENT DOCUMENTS

| | | | |
|---|---|---|---|
| 5,931,570 A * | 8/1999 | Yamuro | 362/355 |
| 6,200,016 B1 * | 3/2001 | Reinemuth et al. | 366/302 |
| 6,758,160 B1 * | 7/2004 | Martin | 116/202 |
| 6,816,072 B2 | 11/2004 | Zoratti | |
| 7,980,317 B1 | 7/2011 | Preta et al. | |
| 2004/0129312 A1 * | 7/2004 | Cuzzo et al. | 137/296 |
| 2005/0000688 A1 * | 1/2005 | Hsu et al. | 166/254.2 |
| 2010/0295672 A1 * | 11/2010 | Hyland et al. | 340/539.1 |
| 2011/0308638 A1 | 12/2011 | Hyland et al. | |
| 2012/0130681 A1 | 5/2012 | Pride | |
| 2012/0261002 A1 * | 10/2012 | Sampson | 137/296 |

* cited by examiner

*Primary Examiner* — David Czekaj
*Assistant Examiner* — Tracy Li
(74) *Attorney, Agent, or Firm* — Richard C. Litman

(57) ABSTRACT

The fire hydrant monitoring system provides for the monitoring of the condition of a plurality of remotely installed hydrants, and sending a warning of any accidental or deliberate tampering or damage to the hydrant to a central station. The hydrant-installed component includes a collar divided into four equal quadrants, which are installed around the upper end of the hydrant barrel and below the head or cap of the hydrant. The collar includes a plurality of cameras and lighting for night operation, and an electrical storage battery for power. The battery may be recharged by solar cells. Each hydrant-installed unit also has a transmitter. Signals of the hydrant condition are sent to a central monitoring station. The monitoring station may monitor the condition of a plurality of remotely installed hydrants, each of the hydrants being equipped with one of the monitoring collars.

12 Claims, 4 Drawing Sheets

FIRE HYDRANT MONITORING SYSTEM

BACKGROUND OF THE INVENTION

1. Field of the Invention

The present invention relates generally to fire-fighting systems, and particularly to a fire hydrant monitoring system for monitoring the status and readiness of remotely located fire hydrants and the surrounding environments of those hydrants.

2. Description of the Related Art

Conventional fire hydrants are generally quite robust and reliable units. They are relatively simple devices in order to provide the required reliability. After all, it is absolutely critical that a fire hydrant be capable of operating as required upon demand, as the alternative is the potential for major property destruction, and perhaps serious injury and loss of life.

However, fire hydrants are frequently tampered with, vandalized, and/or otherwise damaged and/or made non-functional. This may be due to accident or deliberate maliciousness, or a desire to capture water from the water supply of the hydrant, or to steal various components from the hydrant. Regardless of the underlying cause, such tampering and/or damage can easily result in a fire hydrant becoming non-functional. Yet, there has been little development in the past of devices and systems intended or adapted for remotely monitoring the condition of one or more fire hydrants.

Thus, a fire hydrant monitoring system solving the aforementioned problems is desired.

SUMMARY OF THE INVENTION

The fire hydrant monitoring system includes a plurality of small cameras for monitoring the surrounding environment, and a transmitter for transmitting images taken by the cameras and/or other data to a central monitoring station. The system also includes a plurality of lights for night operation of the cameras. Electrical power is provided by a conventional electrical storage cell or battery. Electrical charge is maintained by solar cells. The cameras, lights, and solar cells are protected by a strong and transparent protective cover, e.g., acrylic plastic, polycarbonate, laminated safety glass, etc. The hydrant-installed components of the monitoring system comprise a collar formed of four identical units, each subtending one quadrant of a circular assembly. The collar assembly is installed around the upper end of the hydrant barrel immediately below the cap or head that is installed directly upon the upper end of the barrel. Thus, no modification is required to the hydrant or to any of the components thereof.

A central monitoring station is provided to receive signals from one or more hydrants located remotely from the central station. The transmitter of each of the hydrant-installed units sends a signal to the central station in the event of damage or tampering with the hydrant, or when periodic maintenance or inspection may be required. Each of the hydrant-installed units may also include a receiver for receiving a test signal from the central monitoring station. The hydrant-installed unit transmits a status reply signal in response.

These and other features of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The fire hydrant monitoring system enables the condition of a number of separate fire hydrants to be monitored by a single remotely located monitoring station. The hydrants may be monitored for deliberate or accidental damage. Each of the hydrants sends a signal to the central monitoring station in the event of damage. This provides repair crews with the required notification for prompt repair of such damage to return the hydrant to immediate service.

Figure 1:
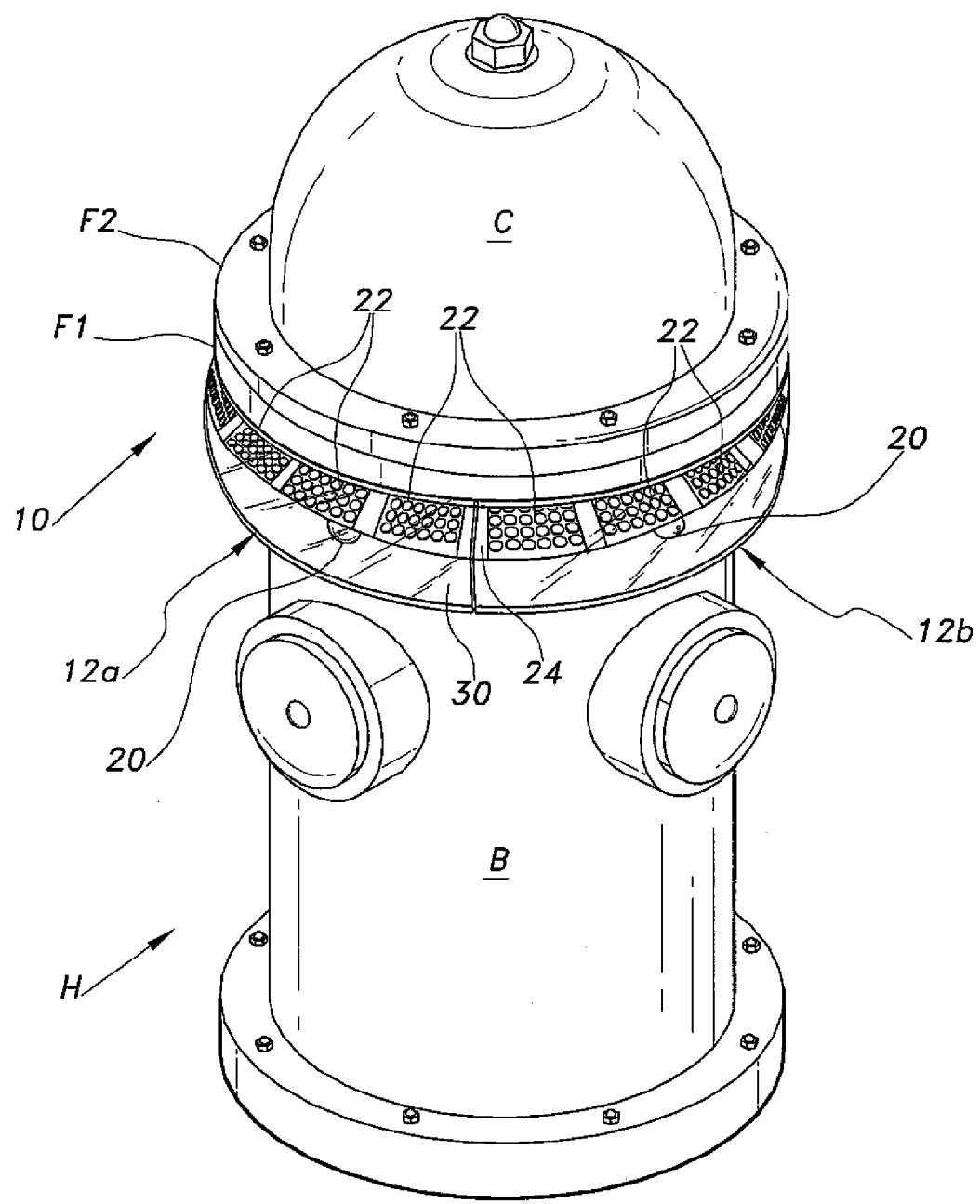
FIG. 1 is an environmental, perspective view of the hydrant-installed component of a fire hydrant monitoring system according to the present invention, as installed on a fire hydrant.
Figure 2:
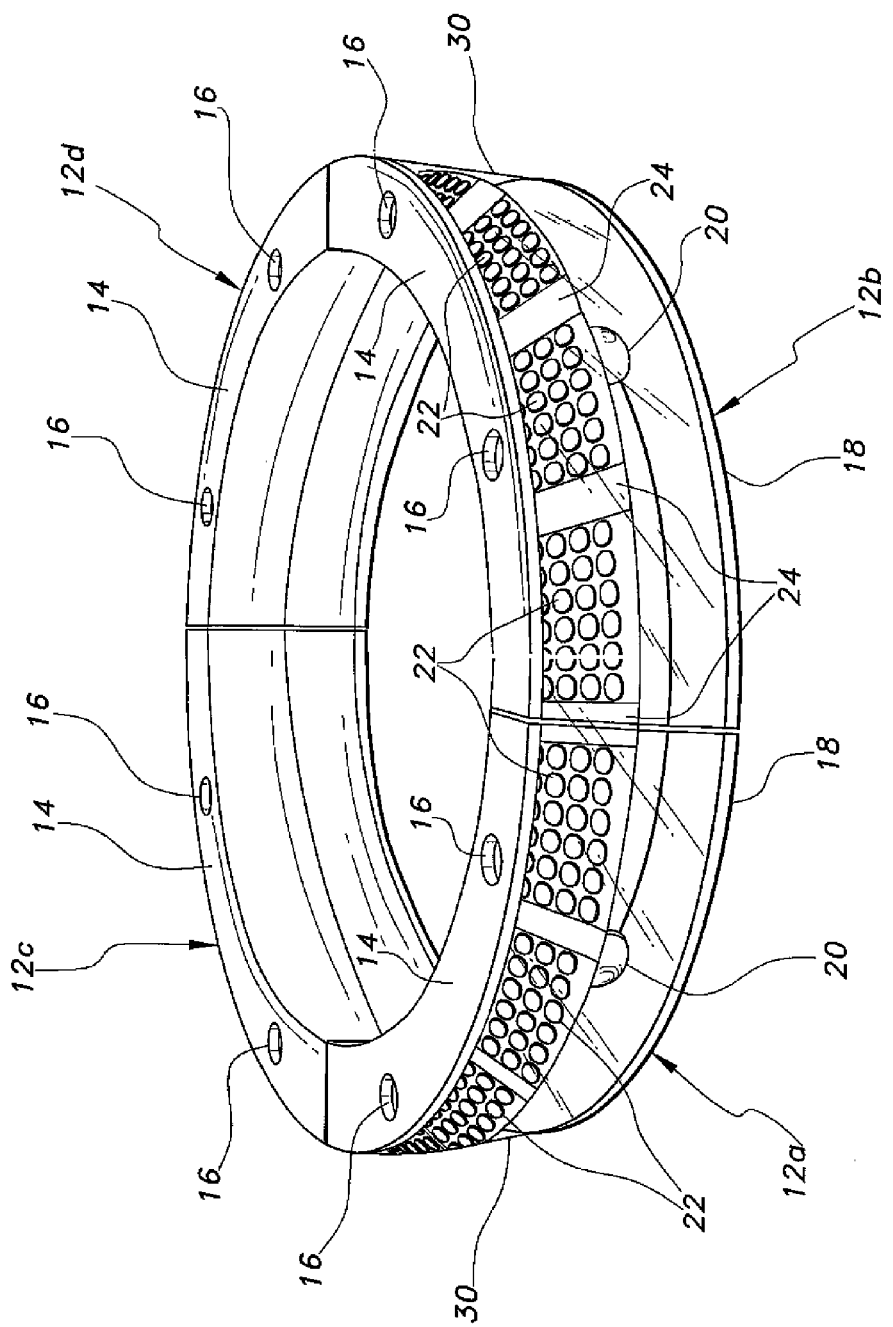
FIG. 2 is a detailed perspective view of the hydrant-installed component of the fire hydrant monitoring system according to the present invention, illustrating further details thereof.

FIG. 1 of the drawings is an environmental perspective view of an exemplary fire hydrant H having a hydrant monitoring device installed thereon. The hydrant H has a conventional barrel or body B and an upper end flange F1. A head or cap C is installed atop the barrel B by a head or cap flange F2. The hydrant-installed component 10 of the hydrant monitoring system actually comprises a collar having four separate quadrants 12a through 12d, as shown in FIG. 2 of the drawings. The four quadrants 12a through 12d are secured around the upper portion of the hydrant barrel B immediately below the upper end flange F1 of the barrel B to define the collar 10, e.g., by bolting to the flange F1 using the conventional hydrant cap attachment bolts that pass through the two flanges F1 and F2. In this manner, the seal between the two flanges F1 and F2 of the hydrant H is not broken and the two flanges F1 and F2 are not separated from one another. Only the flange attachment bolts about one quadrant of the flanges F1 and F2 need to be removed and reinstalled at any one time, as the four quadrants 12a through 12d defining the hydrant-installed component or collar 10 are installed separately from one another.

Figure 3:
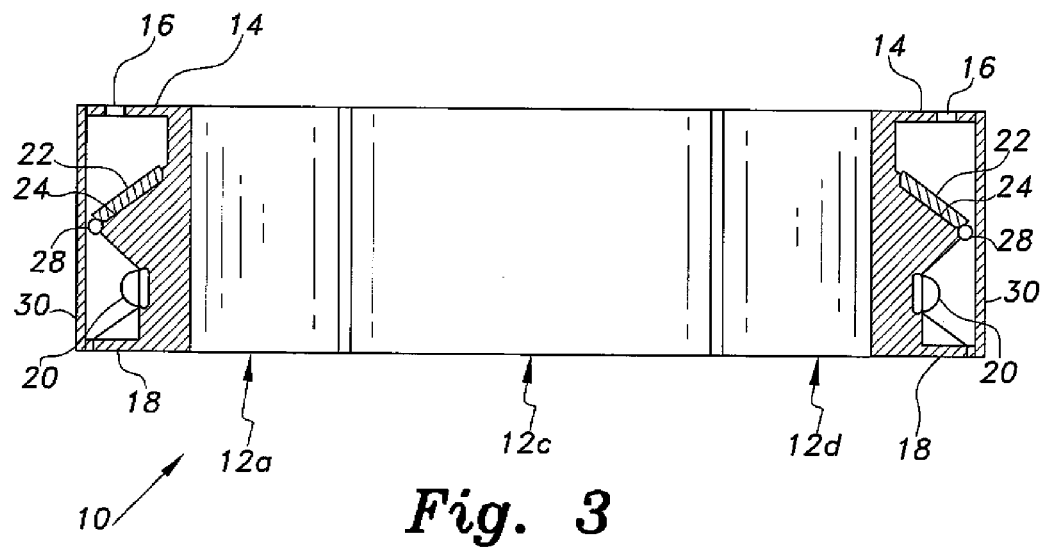
FIG. 3 is an elevation view in section through the hydrant-installed component of the fire hydrant monitoring system according to the present invention, illustrating further details thereof.

FIG. 2 provides a detailed perspective view of the four quadrants 12a through 12d without the fire hydrant H. FIG. 3 provides an elevation view in section across quadrants 12a and 12d to show further details of the quadrants. The quadrants 12a through 12d are substantially identical to one another. Each quadrant has an upper flange 14 having a plurality of hydrant flange mounting or attachment holes 16 therethrough, and a lower flange 18. A small television camera 20, e.g., "minicam" or "lipstick camera," is installed in each of the quadrants 12a through 12d between the upper and lower flanges 14 and 18. The cameras 20 are oriented outward, and each camera preferably has a fairly wide field of view of at least 90°. As the four quadrants 12a through 12d are substantially identical, each of the cameras 20 is installed at the same point about the arcuate circumference of its corresponding quadrant. Thus, the four cameras 20 are positioned 90° apart from one another about the assembled collar 10. The 90° or greater field of view of each of the cameras provides a full 360° view about the assembled collar 10 and the hydrant H upon which the collar 10 is installed. While the cameras 20 comprise one type of sensor installed on the hydrant-installed collar 10, other types of conventional sensors may be installed in addition to the cameras, e.g., infrared sensors or detectors, audio detectors, vibration or motion detectors, etc.

Electrical power for the cameras 20 is provided by solar cells 22 disposed upon a frustoconical surface 24 extending between the two flanges 14 and 18 of each of the quadrants 12a through 12d. The frustoconical surface 24 slopes downward and outward in order to position the solar cells 22 at an optimum angle to receive sunlight. The solar cells 22 are connected to a conventional electrical storage system, e.g., electrical storage cells or batteries 26, as shown in the block diagram of FIG. 4.

The cameras 20 are preferably configured to receive light in the visual spectrum, i.e., they will require external lighting in order to produce images. Thus, they cannot function at night or in conditions of poor lighting without a light source of some sort. This requirement is met by a light 28 disposed circumferentially along the outer edge of each of the frustoconical surfaces 24 immediately above each of the cameras 20. Each quadrant 12a through 12d has its own circumferential light 28. The four lights 28 provide lighting for 360° about the assembled collar 10. The lights 28 may be neon lights or other lights (e.g., LEDs, etc.), and draw electrical power from the battery 26 noted above. The lights 28 provide an additional function as well, as they are highly visible at night to provide a warning of an obstruction to motorists and pedestrians, and also facilitate rapid location of the hydrant H to which the collar 10 is attached, should use of the hydrant H be required. The cameras 20, solar cells 22, and lights 28 are protected by a transparent, break-resistant shield 30 that extends circumferentially about the exterior of each of the quadrants 12a through 12d, extending vertically from the upper flange 14 to the lower flange 18.

Figure 4:
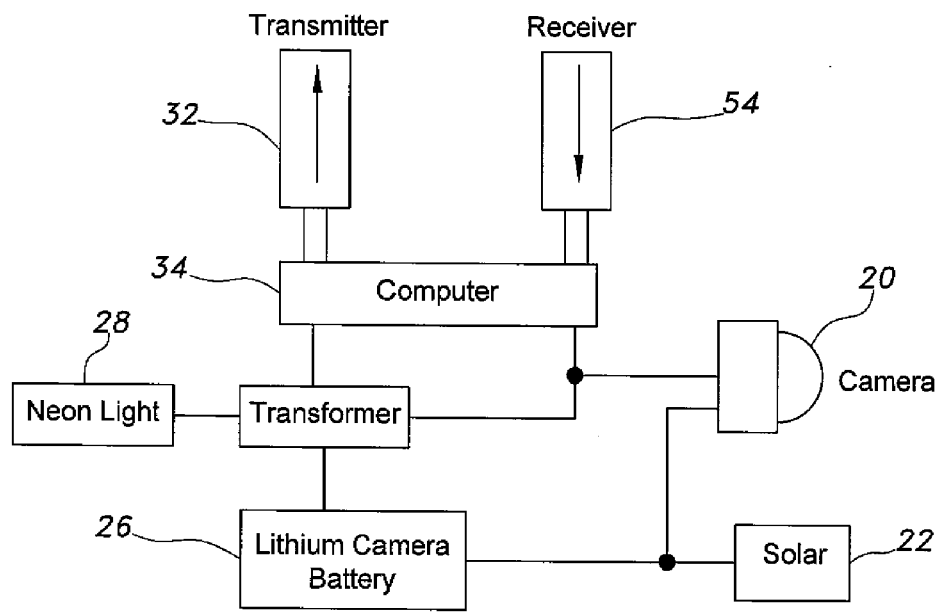
FIG. 4 is a block diagram illustrating the various components of the hydrant-installed component of the fire hydrant monitoring system according to the present invention, and their interrelationships with one another.

The collar 10 should include some means of sending a signal to a remotely located central monitoring site, in order to alert personnel of any problem with the hydrant H. FIG. 4 provides a block diagram of the componentry associated with each collar 10. It will be seen that in some cases only one of the components (e.g., the transmitter) is required for the four quadrants 12a through 12d forming the collar 10. The four quadrants 12a through 12d may be connected electrically to one another in order to share such single components. Thus, the collar 10 includes a transmitter 32 that communicates electronically with a microcomputer 34. The microcomputer 34 communicates electronically with the sensors, e.g., cameras 20, to provide a signal of any anomalous activity to the transmitter 32. The transmitter 32 then sends a signal to the central monitoring station 36.

Figure 5:
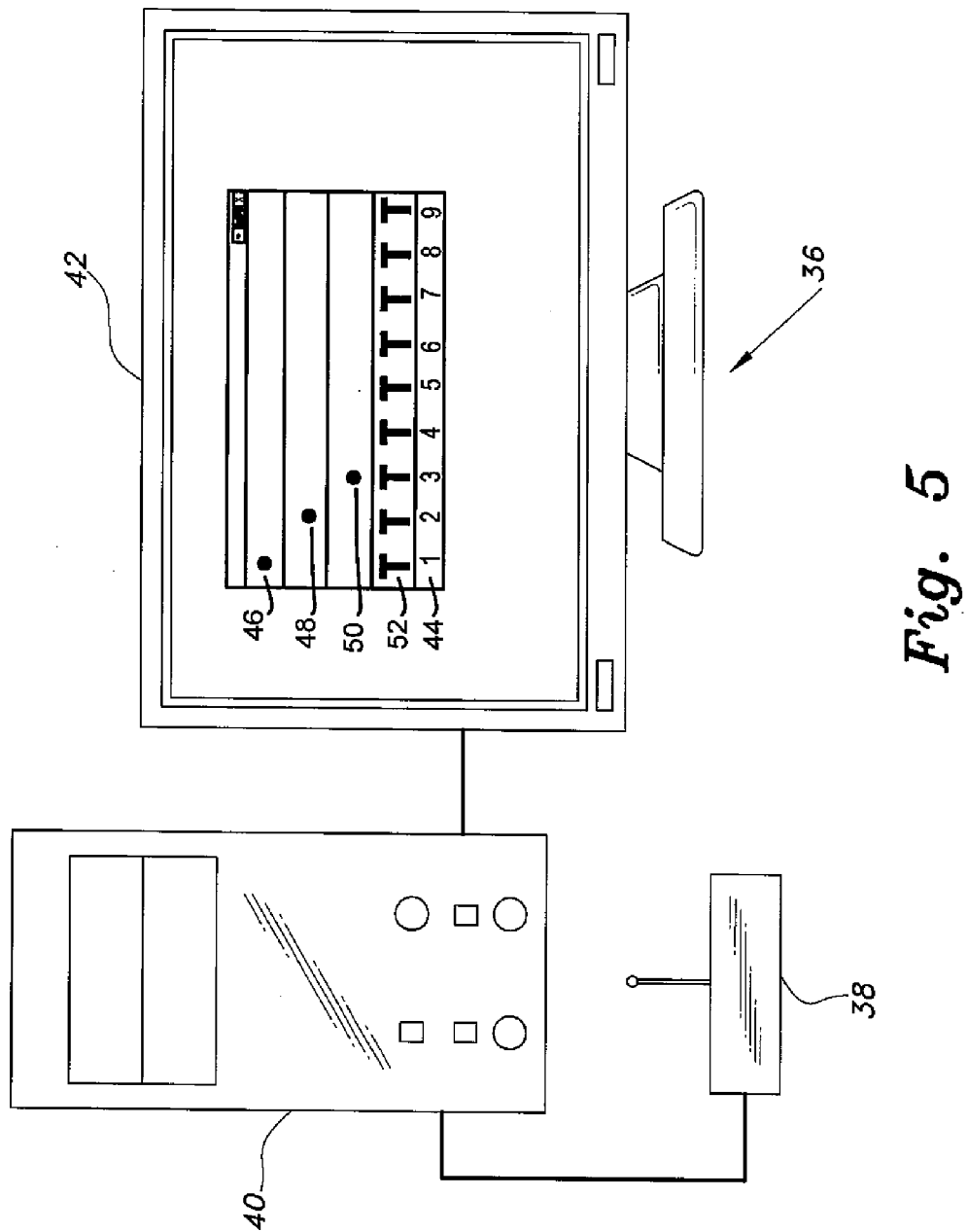
FIG. 5 is an elevation view illustrating an exemplary computer and monitor system for monitoring the condition of a plurality of fire hydrant-installed components of the fire hydrant monitoring system according to the present invention.

The basic components of the central monitoring station 36 are shown in FIG. 5 of the drawings. The monitoring station 36 is capable of receiving and processing signals and data received from a number of remotely disposed collars 10 situated with corresponding hydrants H. The monitoring station includes a receiver 38 configured to receive signals and data from the various collars 10 communicating with the central station 36. The receiver 38, in turn, communicates electronically with a central computer 40. The computer 40 processes signals and data received from any of the collars 10 by means of the receiver 38. The data is displayed on a monitor 42. The computer 40 may be programmed to display different conditions for a plurality of hydrant collars. Conditions for an exemplary group of nine collars, numbered 1 through 9, are shown along the lowermost row 44 of the monitor screen 42 in FIG. 5. For example, a green light or other icon 46 may be displayed to indicate that the given hydrant collar, e.g., the collar number 1 for the first hydrant in the monitored group, is operational. A yellow light or other icon 48 may be displayed to indicate a need for inspection or maintenance for one of the hydrants, e.g., the second hydrant in the series monitored by collar number 2. Finally, a red light or other icon 50 may be displayed to indicate damage or malfunction of a hydrant according to its monitoring collar, e.g., collar number 3. Audible warnings may be provided as well, and/or the lights or icons may be set to flash in order to draw attention to them more rapidly. Check keys or check digits 52 may be provided on the monitor screen 42 as well, to confirm the validity of information received.

Returning to FIG. 4, it will be noted that a receiver 54 is also provided with each hydrant collar 10. The receiver is not absolutely required to provide any of the functions described further above, but allows the collars 10 to receive a test signal from the central monitoring station 36. The transmitter 38 of the monitoring station 36 may comprise a transceiver to allow it to send out test signals in accordance with the central computer 40. The computer 34 (FIG. 4) of each collar 10 receives such a test signal, and responds by testing the various components (cameras, battery power, lights, etc.) to confirm their operability. When this has been accomplished, the transmitter 32 (FIG. 4) of the collar responds by sending a signal back to the central monitoring station 36 and its central computer 40. The results are displayed on the monitor screen 42, as described further above.

It is to be understood that the present invention is not limited to the embodiments described above, but encompasses any and all embodiments within the scope of the following claims.

I claim:

1. A fire hydrant monitoring system for a fire hydrant, the fire hydrant having a barrel having at least one outlet, with an upper end and a head disposed above the upper end of the barrel, the fire hydrant monitoring system comprising:
    a collar adapted for placement around the upper end of the barrel above the at least one outlet and below the head of the fire hydrant;
    a plurality of sensors disposed in the collar;
    wherein the sensors include cameras disposed circumferentially about the collar;
    a plurality of lights disposed circumferentially about the collar;
    a plurality of solar cells disposed about the collar, the solar cells communicating electrically with the cameras and the lights;
    a transmitter disposed in the collar, the transmitter communicating with the sensors; and
    a monitoring station remotely disposed from the fire hydrant and collar, the monitoring station having a receiver for receiving data transmitted by the transmitter.

2. The fire hydrant monitoring system according to claim 1, wherein the lights are neon lights.

3. The fire hydrant monitoring system according to claim 1, wherein said collar further comprises:
    a collar upper flange;
    a collar lower flange; and
    a frustoconical surface disposed between the collar upper flange and the collar lower flange, the solar cells being disposed upon the frustoconical surface.

4. The fire hydrant monitoring system according to claim 1, wherein:

the collar comprises first, second, third, and fourth quadrants, the quadrants collectively defining the collar; and a transparent, break resistant shield is disposed externally about each of the quadrants.

5. The fire hydrant monitoring system according to claim 1, further comprising:

a transmitter located at the monitoring station; and a receiver disposed at the collar, the collar receiver receiving test signals from the monitoring station transmitter.

6. A fire hydrant monitoring system for a fire hydrant, the fire hydrant having a barrel having at least one outlet, with an upper end and a head disposed above the upper end of the barrel, the fire hydrant monitoring system comprising:

a hydrant monitoring device adapted for mounting on the fire hydrant above the at least one outlet on the barrel, the monitoring device having:

a collar adapted for mounting around the upper end of the barrel below the head of the fire hydrant;

a plurality of cameras;

a plurality of lights disposed circumferentially about the monitoring device;

wherein the lights are neon lights;

a plurality of solar cells disposed about the monitoring device, the solar cells communicating electrically with the cameras and the lights; and a transmitter communicating with the sensors; and a monitoring station remotely disposed from the fire hydrant and monitoring device, the monitoring station having a receiver for receiving data transmitted by the transmitter; and a transmitter disposed at the monitoring station; and a receiver disposed on the collar, the collar receiver receiving test signals from the monitoring station transmitter.

7. The fire hydrant monitoring system according to claim 6, wherein said collar further comprises:

a collar upper flange;

a collar lower flange; and a frustoconical surface disposed between the collar upper flange and the collar lower flange, the solar cells being disposed upon the frustoconical surface.

8. The fire hydrant monitoring system according to claim 6, wherein the collar comprises first, second, third, and fourth quadrants, the quadrants collectively defining the collar, the collar further comprising a transparent, break resistant shield disposed externally about each of the quadrants.

9. A fire hydrant monitoring system for a fire hydrant, the fire hydrant having a barrel having at least one outlet, with an upper end and a head disposed above the upper end of the barrel, the fire hydrant monitoring system comprising:

first, second, third, and fourth quadrants adapted for mounting around the upper end of the barrel, above the at least one outlet, and below the head of the fire hydrant, the quadrants collectively defining a collar;

a transparent, break resistant shield disposed externally about each of the quadrants;

a plurality of sensors mounted on the collar;

wherein the sensors comprise cameras disposed circumferentially about the collar;

a plurality of lights disposed circumferentially about the collar; and a plurality of solar cells disposed about the collar, the solar cells communicating electrically with the cameras and the lights;

a transmitter disposed on the collar, the transmitter communicating with the sensors; and a monitoring station remotely disposed from the fire hydrant and quadrants, the monitoring station having a receiver for receiving data transmitted by the transmitter.

10. The fire hydrant monitoring system according to claim 9, wherein the lights are neon lights.

11. The fire hydrant monitoring system according to claim 9, wherein said collar comprises:

a collar upper flange;

a collar lower flange; and a frustoconical surface disposed between the collar upper flange and the collar lower flange, the solar cells being disposed upon the frustoconical surface.

12. The fire hydrant monitoring system according to claim 9, further comprising:

a transmitter disposed at the monitoring station; and a receiver mounted on the collar, the collar receiver receiving test signals from the monitoring station transmitter.

\* \* \* \* \*